US012116817B2

(12) United States Patent
Steiger et al.

(10) Patent No.: US 12,116,817 B2
(45) Date of Patent: Oct. 15, 2024

(54) HINGE MECHANISM, COMPARTMENT DOOR ASSEMBLY WITH SUCH A HINGE MECHANISM, CABINET OR REFRIGERATOR WITH SUCH A HINGE MECHANISM AND/ OR COMPARTMENT DOOR ASSEMBLY AND RECREATIONAL VEHICLE

(71) Applicant: Dometic Sweden AB, Solna (SE)

(72) Inventors: Michael Steiger, Wenden (DE); Gerold Heitze, Wilnsdorf (DE); Magnus Manderbach, Dillenburg (DE); Sergej Krist, Neunkirchen (DE)

(73) Assignee: Dometic Sweden AB, Solna (SE)

( * ) Notice: Subject to any disclaimer, the term of this patent is extended or adjusted under 35 U.S.C. 154(b) by 119 days.

(21) Appl. No.: 16/884,698

(22) Filed: May 27, 2020

(65) Prior Publication Data

US 2020/0378165 A1 Dec. 3, 2020

(30) Foreign Application Priority Data

May 29, 2019 (DE) ........................ 102019207919.9

(51) Int. Cl.
*E05D 15/50* (2006.01)
*E05D 7/02* (2006.01)
(Continued)

(52) U.S. Cl.
CPC ............ *E05D 15/505* (2013.01); *E05D 7/02* (2013.01); *E05D 7/1077* (2013.01); (Continued)

(58) Field of Classification Search
CPC ....... E05D 7/02; E05D 7/1077; E05D 15/505; E05D 15/507; E05D 15/502;
(Continued)

(56) References Cited

U.S. PATENT DOCUMENTS 1,550,205 A 8/1925 Andrew
1,749,336 A 3/1930 Geyer
(Continued)

FOREIGN PATENT DOCUMENTS

AU 2010278016 B2 8/2013
AU 2010254762 B2 1/2014
(Continued)

OTHER PUBLICATIONS

Office Action Issued in Chinese Patent Application No. 201780051244.4 dated May 25, 2021.
(Continued)

*Primary Examiner* — Hiwot E Tefera
(74) *Attorney, Agent, or Firm* — Dinsmore & Shohl LLP

(57) ABSTRACT

The present invention relates to a hinge mechanism for supporting a compartment door pivotally to a compartment frame and/or a housing of a cabinet or a refrigerator, in particular provided for a recreational vehicle like a motor home or caravan. The hinge mechanism has at least two receiving sections and at least two engaging sections. Each of the receiving sections is configured to be coupled to one of the compartment door and the frame respectively the housing. Each of the engaging is configured to be coupled to the other of the compartment door and the frame respectively the housing. Furthermore, the present invention refers to a compartment door assembly with such a hinge mechanism and a cabinet or refrigerator with such a hinge mechanism and/or compartment door assembly. Finally, the present invention also refers to a recreational vehicle provided with at least one of the above devices.

12 Claims, 4 Drawing Sheets

(51) Int. Cl.
*E05D 7/10* (2006.01)
*F25D 23/02* (2006.01)

(52) U.S. Cl.
CPC ......... *F25D 23/025* (2013.01); *F25D 23/028* (2013.01); *E05Y 2900/20* (2013.01); *E05Y 2900/31* (2013.01); *F25D 2323/022* (2013.01); *F25D 2323/024* (2013.01)

(58) Field of Classification Search
CPC ... Y10T 16/528; Y10T 16/5285; A47B 77/04; A47B 96/00; A47B 2220/0072; F25D 23/028; F25D 2323/022; F25D 2323/024; F25D 23/025; B60P 3/32; E05B 1/0015; E05Y 2201/214; E05Y 2800/12; E05Y 2800/176; E05Y 2900/20; E05Y 2900/31
See application file for complete search history.

(56) References Cited

U.S. PATENT DOCUMENTS 2,166,534 A 7/1939 Rosenfeld
2,541,453 A 2/1951 West
2,624,909 A 1/1953 Khujawa
2,745,132 A 5/1956 Clark et al.
2,790,992 A 5/1957 Campbell
2,885,723 A 5/1959 Altmann
2,920,341 A * 1/1960 Amstutz ............... E05D 7/1077 16/260
2,938,227 A * 5/1960 Lhota .................... E05D 7/1077 160/199
3,027,732 A 4/1962 Mann et al.
3,048,898 A 8/1962 Davis
3,174,193 A 3/1965 Smith
3,333,726 A * 8/1967 Belanger ............... E05D 7/1072 16/257
3,389,424 A 6/1968 Fellwock
3,403,473 A 10/1968 Navarro
3,407,016 A 10/1968 Kronenberger
3,455,061 A 7/1969 Kesling et al.
3,590,594 A 7/1971 Arend
3,629,972 A 12/1971 Rehberg et al.
3,675,271 A 7/1972 Fellwock et al.
3,733,749 A * 5/1973 Parera ................... E05D 15/507 49/382
3,788,689 A * 1/1974 Lloyd ................... E05C 19/006 292/241
3,869,753 A 3/1975 Boback
3,889,419 A 6/1975 Maleck
4,014,178 A 3/1977 Kells
4,132,034 A 1/1979 Van Siclen
4,215,449 A 8/1980 Loikitz
4,217,010 A 8/1980 Webb
4,248,489 A 2/1981 Barroero et al.
4,495,673 A 1/1985 Khan
4,503,582 A 3/1985 Gurubatham
4,503,583 A 3/1985 Frohbieter
4,539,819 A 9/1985 Alba et al.
4,613,174 A 9/1986 Berg et al.
4,638,644 A 1/1987 Gidseg
4,732,435 A 3/1988 Bailey et al.
4,741,175 A 5/1988 Schulze
4,771,532 A 9/1988 Taylor, Jr. et al.
4,876,860 A 10/1989 Negishi
4,893,850 A 1/1990 Mizusawa
4,914,341 A 4/1990 Weaver et al.
4,918,271 A 4/1990 Deeg
5,056,332 A 10/1991 Tajima et al.
5,064,255 A 11/1991 Inui et al.
5,228,240 A 7/1993 Barroero et al.
D342,743 S 12/1993 Renner
D342,744 S 12/1993 Renner
5,285,652 A 2/1994 Day
5,355,556 A * 10/1994 Lyon ......................... E05D 7/02 16/265
5,530,992 A * 7/1996 Baermann ............. E05D 15/505 49/382
5,548,927 A * 8/1996 Song ..................... E05D 15/505 49/193
5,577,822 A 11/1996 Seon
5,675,934 A 10/1997 Park
5,829,197 A * 11/1998 Oh ........................ E05D 15/505 16/231
5,845,503 A 12/1998 Choi
5,926,916 A * 7/1999 Lee ....................... E05D 15/502 16/230
5,931,004 A 8/1999 Yoo et al.
5,966,951 A 10/1999 Hallin et al.
5,966,963 A 10/1999 Kovalaske
5,983,453 A 11/1999 Miwa
6,000,769 A * 12/1999 Chen ....................... G06F 1/181 220/817
6,000,771 A * 12/1999 Wissinger .............. F25D 23/02 312/401
6,119,468 A 9/2000 Seok
6,327,867 B1 12/2001 Hyodo et al.
6,370,895 B1 4/2002 Sakuma et al.
6,401,482 B1 6/2002 Lee et al.
D468,325 S 1/2003 Lorek et al.
D468,326 S 1/2003 Lorek et al.
D468,327 S 1/2003 Lorek et al.
6,543,250 B1 4/2003 Mills et al.
D476,667 S 7/2003 Lorek et al.
6,609,750 B1 8/2003 Cauduro
6,715,305 B2 4/2004 Doi et al.
6,761,278 B2 7/2004 Hyp et al.
D495,722 S 9/2004 Avalos Barcenas et al.
6,799,434 B1 10/2004 Hobbs, Jr.
6,802,155 B1 10/2004 Kawabata et al.
D501,659 S 2/2005 Yamaji
6,868,692 B2 3/2005 Choi
6,880,903 B2 4/2005 O'Halloran et al.
6,883,841 B2 4/2005 Kawabata et al.
D508,502 S 8/2005 Moseley
7,032,408 B2 4/2006 Dentella et al.
7,036,895 B2 5/2006 Han
7,043,886 B1 5/2006 Chubb
D540,831 S 4/2007 Kim et al.
D542,784 S 5/2007 Franck et al.
D544,856 S 6/2007 Hyodo
7,237,402 B2 7/2007 Hallin et al.
D550,256 S 9/2007 Lei et al.
D551,658 S 9/2007 Hussaini et al.
7,269,968 B2 9/2007 Harder et al.
7,278,569 B2 10/2007 Cohen et al.
7,296,432 B2 11/2007 Muller
D563,998 S 3/2008 Doberstein et al.
D578,505 S 10/2008 Tejima et al.
7,516,515 B2 4/2009 LeimKuehler et al.
D595,887 S 7/2009 Blom
D604,340 S 11/2009 Kim et al.
D607,448 S 1/2010 Hui et al.
7,736,179 B2 6/2010 Cook et al.
7,784,219 B2 8/2010 Yoshikawa et al.
D623,154 S 9/2010 Tu
7,810,862 B2 10/2010 Smith
7,913,355 B2 3/2011 Choi
D635,530 S 4/2011 Sung et al.
8,006,515 B2 8/2011 Hallin et al.
8,020,403 B2 9/2011 Rotter et al.
8,136,367 B2 3/2012 Froelicher et al.
8,146,383 B2 4/2012 Lorek et al.
D662,504 S 6/2012 Lohman
8,256,234 B2 9/2012 Watson et al.
D668,111 S 10/2012 Borjesson
8,277,005 B2 10/2012 Jung et al.
8,281,611 B2 10/2012 Davis et al.
D673,144 S 12/2012 Onoue
8,322,805 B2 12/2012 Kwon et al.
D674,391 S 1/2013 Chatterjee et al.
8,375,734 B2 2/2013 Hall et al.
8,388,078 B2 3/2013 Kwon et al.
8,424,985 B2 4/2013 Kwon et al.
8,499,578 B2 8/2013 Ferragut, II et al.

(56) References Cited

U.S. PATENT DOCUMENTS 8,506,026 B2 8/2013 Kim et al.
D691,608 S 10/2013 Samuels et al.
8,544,291 B2 10/2013 Kim et al.
8,544,973 B2 10/2013 Kwon et al.
8,567,885 B2 10/2013 Lee et al.
8,651,330 B2 2/2014 Krause et al.
8,651,331 B2 2/2014 Krause et al.
8,677,778 B2 3/2014 Jeon et al.
D701,888 S 4/2014 Schumaker et al.
8,695,371 B2 4/2014 Boarman et al.
8,701,940 B2 4/2014 Krause et al.
8,820,583 B2 9/2014 Kim
8,827,389 B2 9/2014 Lee et al.
8,875,538 B2 11/2014 Lee et al.
8,893,523 B2 11/2014 Talegaonkar et al.
8,925,344 B2 1/2015 Mitchell et al.
8,944,540 B2 2/2015 Kim et al.
D725,233 S 3/2015 Behling
8,966,821 B2 3/2015 Walker et al.
9,021,828 B2 5/2015 Vitan et al.
9,022,494 B2 5/2015 Lehman et al.
9,097,454 B2 8/2015 LeClear et al.
9,115,924 B2 8/2015 LeClear et al.
D738,938 S 9/2015 Yamada et al.
9,127,871 B2 9/2015 Bortoletto et al.
9,170,040 B2 10/2015 An
D749,588 S 2/2016 Cox
9,297,573 B2 3/2016 Krause et al.
9,302,897 B2 4/2016 Dherde
9,309,103 B2 4/2016 Ergican et al.
D764,028 S 8/2016 Schoenherr et al.
D768,129 S 10/2016 Chen
D775,408 S 12/2016 Huyghe
D782,486 S 3/2017 Nalbandian et al.
9,672,998 B2 6/2017 Watanabe
D803,602 S 11/2017 Hightower et al.
D813,189 S 3/2018 Lundgard
D826,291 S 8/2018 Lim et al.
D839,318 S 1/2019 Meda et al.
D849,803 S 5/2019 Meda et al.
D865,007 S 10/2019 Meda
10,488,954 B1 11/2019 Huang
D869,441 S 12/2019 Jeong et al.
10,634,417 B2 4/2020 Xingbiao
D884,679 S 5/2020 Lin et al.
D887,459 S 6/2020 Olsson
10,697,694 B2 6/2020 Wenden et al.
10,928,118 B2 2/2021 Xingbiao
11,187,456 B2 11/2021 Remmel et al.
2002/0069654 A1 6/2002 Doi et al.
2003/0051407 A1 3/2003 Sosa
2003/0131618 A1 7/2003 Doi et al.
2004/0000028 A1* 1/2004 Kim ...................... E05D 15/505 16/230
2004/0040212 A1 3/2004 Kawabata et al.
2004/0104654 A1 6/2004 Lee et al.
2004/0107727 A1 6/2004 Kim et al.
2004/0148955 A1 8/2004 Johansson
2004/0172881 A1 9/2004 Minami
2005/0200253 A1 9/2005 Wissinger et al.
2005/0218765 A1 10/2005 Song et al.
2005/0279122 A1 12/2005 Cohen et al.
2006/0170649 A1 8/2006 Kosugi et al.
2007/0176527 A1 8/2007 Kosugi et al.
2007/0216272 A1 9/2007 Park
2007/0227208 A1 10/2007 Ostberg
2007/0295024 A1 12/2007 Hallin
2008/0047209 A1 8/2008 Hinterholzer et al.
2008/0048539 A1 8/2008 Beek et al.
2008/0202824 A1 8/2008 Philipp et al.
2008/0203739 A1 8/2008 Lim et al.
2008/0231159 A1 9/2008 Lee et al.
2009/0095011 A1 4/2009 Cho
2009/0142458 A1 6/2009 McCann
2009/0165478 A1 7/2009 Devos
2010/0126185 A1 5/2010 Cho et al.
2010/0218925 A1 9/2010 Candeo
2011/0036693 A1 2/2011 Lin et al.
2011/0113810 A1 5/2011 Mitchell et al.
2011/0162403 A1 7/2011 Selin et al.
2011/0252813 A1 10/2011 Veltrop
2012/0000240 A1 1/2012 Junge et al.
2012/0023998 A1 2/2012 Oh et al.
2012/0023999 A1 2/2012 Oh et al.
2012/0024001 A1 2/2012 Oh et al.
2012/0102999 A1 5/2012 Anselmino et al.
2012/0146925 A1 6/2012 An et al.
2012/0159968 A1 6/2012 Doucet et al.
2012/0167611 A1 7/2012 Weirich et al.
2012/0222435 A1 9/2012 Lopes et al.
2012/0279247 A1 11/2012 Katu et al.
2012/0324918 A1 12/2012 Bortoletto et al.
2012/0326587 A1 12/2012 Jeong et al.
2013/0161165 A1 6/2013 Han
2013/0257248 A1* 10/2013 Bedkowski .............. H02B 1/38 312/329
2013/0270286 A1 10/2013 Fukui
2014/0049926 A1 2/2014 Bas et al.
2014/0075844 A1 3/2014 Walker et al.
2014/0150460 A1 6/2014 Boarman et al.
2014/0150468 A1 6/2014 Boarman
2014/0150487 A1 6/2014 Boarman
2014/0165601 A1 6/2014 Boarman et al.
2014/0165602 A1 6/2014 Boarman
2014/0165605 A1 6/2014 Boarman et al.
2014/0165611 A1 6/2014 Boarman et al.
2014/0223948 A1 8/2014 Visin
2014/0246970 A1 9/2014 Park et al.
2014/0260407 A1 9/2014 Boehringer et al.
2015/0082812 A1 3/2015 Boehringer et al.
2015/0107285 A1 4/2015 Mitchell et al.
2015/0123534 A1 5/2015 Kim et al.
2015/0135762 A1 5/2015 Eveland et al.
2015/0153093 A1 6/2015 Junge
2015/0169005 A1 6/2015 Yanagida
2015/0193073 A1 7/2015 Dmytriw et al.
2015/0225225 A1 8/2015 Tae et al.
2015/0247668 A1 9/2015 Willis
2015/0276305 A1 10/2015 Hammond et al.
2015/0284237 A1 10/2015 McMahan et al.
2015/0293661 A1 10/2015 Gomez
2015/0322694 A1 11/2015 Carr et al.
2015/0330678 A1 11/2015 Hu
2015/0330704 A1 11/2015 Kaymak et al.
2016/0025406 A1 1/2016 An
2016/0076187 A1 3/2016 Lee et al.
2016/0076803 A1 3/2016 Pawar
2018/0018023 A1 1/2018 Nakamura et al.
2018/0135343 A1* 5/2018 Heater .................... E05D 15/52
2018/0224191 A1 8/2018 Marolda
2018/0307362 A1 10/2018 Komala et al.
2019/0063132 A1 2/2019 Ike et al.
2019/0086139 A1 3/2019 Xingbiao
2019/0145140 A1 5/2019 Zhang et al.
2019/0178564 A1 6/2019 Steiger et al.
2019/0178570 A1 6/2019 Remmel et al.
2020/0149334 A1 5/2020 Lundqvist
2020/0216229 A1 7/2020 Guan
2020/0378165 A1 12/2020 Steiger

FOREIGN PATENT DOCUMENTS

AU 2011248797 B2 10/2014
AU 201710975 3/2017
AU 201710976 3/2017
AU 201710991 3/2017
AU 201710992 3/2017
AU 201710993 3/2017
AU 201717910 2/2018
AU 201717920 2/2018
AU 201810504 2/2018
AU 201810505 2/2018
AU 201810506 2/2018
AU 201810658 2/2018

(56) References Cited

FOREIGN PATENT DOCUMENTS

| | | | |
|---|---|---|---|
| AU | 201810730 | | 2/2018 |
| AU | 201810733 | | 2/2018 |
| AU | 2017317557 | A1 | 2/2019 |
| AU | 2018217298 | A1 | 3/2019 |
| AU | 2019284131 | | 7/2020 |
| AU | 202110915 | | 3/2021 |
| AU | 202110916 | | 3/2021 |
| AU | 202110917 | | 3/2021 |
| AU | 202110918 | | 3/2021 |
| AU | 202110919 | | 3/2021 |
| AU | 202110920 | | 3/2021 |
| CA | 2582586 | | 10/2007 |
| CA | 2638349 | A1 | 6/2009 |
| CA | 2670339 | A1 | 7/2010 |
| CA | 2706048 | A1 | 12/2010 |
| CA | 2757470 | A1 | 12/2010 |
| CA | 2706067 | A1 | 1/2011 |
| CA | 2755035 | A1 | 4/2012 |
| CN | 86206686 | U | 7/1987 |
| CN | 2084092 | U | 9/1991 |
| CN | 2108881 | U | 7/1992 |
| CN | 2150296 | Y | 12/1993 |
| CN | 2203997 | Y | 7/1995 |
| CN | 2209205 | Y | 10/1995 |
| CN | 2227188 | Y | 5/1996 |
| CN | 2243510 | Y | 12/1996 |
| CN | 2263178 | Y | 9/1997 |
| CN | 2272124 | Y | 1/1998 |
| CN | 1172939 | A | 2/1998 |
| CN | 2307895 | Y | 2/1999 |
| CN | 2315255 | Y | 4/1999 |
| CN | 2414148 | Y | 1/2001 |
| CN | 2429799 | Y | 5/2001 |
| CN | 2450331 | Y | 9/2001 |
| CN | 2496973 | Y | 6/2002 |
| CN | 2498302 | Y | 7/2002 |
| CN | 2521560 | Y | 11/2002 |
| CN | 2558937 | Y | 7/2003 |
| CN | 1465837 | A | 1/2004 |
| CN | 2602131 | Y | 2/2004 |
| CN | 2630763 | Y | 8/2004 |
| CN | 1540127 | A | 10/2004 |
| CN | 2675818 | Y | 2/2005 |
| CN | 1690627 | A | 11/2005 |
| CN | 1719168 | A | 1/2006 |
| CN | 2867229 | Y | 2/2007 |
| CN | 101231115 | A | 7/2008 |
| CN | 201144611 | Y | 11/2008 |
| CN | 201152661 | Y | 11/2008 |
| CN | 201165779 | Y | 12/2008 |
| CN | 201173038 | Y | 12/2008 |
| CN | 201386456 | Y | 1/2010 |
| CN | 201434557 | Y | 3/2010 |
| CN | 101787839 | Y | 7/2010 |
| CN | 201653044 | U | 11/2010 |
| CN | 201724505 | U | 1/2011 |
| CN | 201756879 | U | 3/2011 |
| CN | 102042733 | A | 5/2011 |
| CN | 202017423 | U | 10/2011 |
| CN | 102251729 | A | 11/2011 |
| CN | 102356289 | A | 2/2012 |
| CN | 102362131 | A | 2/2012 |
| CN | 102362132 | A | 2/2012 |
| CN | 102362134 | A | 2/2012 |
| CN | 202131939 | U | 2/2012 |
| CN | 202361741 | U | 8/2012 |
| CN | 202393147 | U | 8/2012 |
| CN | 202627839 | U | 12/2012 |
| CN | 202673061 | U | 1/2013 |
| CN | 202731625 | U | 2/2013 |
| CN | 202755782 | U | 2/2013 |
| CN | 202788468 | U | 3/2013 |
| CN | 202915623 | U | 5/2013 |
| CN | 203240855 | U | 10/2013 |
| CN | 203296635 | U | 11/2013 |
| CN | 103644696 | A | 3/2014 |
| CN | 203605570 | U | 5/2014 |
| CN | 104033058 | A | 9/2014 |
| CN | 104075531 | A | 10/2014 |
| CN | 203957955 | U | 11/2014 |
| CN | 203957956 | U | 11/2014 |
| CN | 203957958 | U | 11/2014 |
| CN | 203964501 | U | 11/2014 |
| CN | 203964502 | U | 11/2014 |
| CN | 203964503 | U | 11/2014 |
| CN | 203964506 | U | 11/2014 |
| CN | 203964508 | U | 11/2014 |
| CN | 203964522 | U | 11/2014 |
| CN | 203964529 | U | 11/2014 |
| CN | 203964534 | U | 11/2014 |
| CN | 203964546 | U | 11/2014 |
| CN | 203964547 | U | 11/2014 |
| CN | 203980760 | U | 12/2014 |
| CN | 104296467 | A | 1/2015 |
| CN | 204085031 | U | 1/2015 |
| CN | 204128268 | U | 1/2015 |
| CN | 104328966 | A | 2/2015 |
| CN | 104329879 | A | 2/2015 |
| CN | 104329880 | A | 2/2015 |
| CN | 104332862 | A | 2/2015 |
| CN | 104343305 | A | 2/2015 |
| CN | 102829595 | B | 3/2015 |
| CN | 204282888 | A | 4/2015 |
| CN | 204359041 | A | 5/2015 |
| CN | 104677021 | A | 6/2015 |
| CN | 106168430 | A | 11/2016 |
| CN | 304201123 | S | 7/2017 |
| CN | 107525337 | A | 12/2017 |
| CN | 304444504 | S | 1/2018 |
| CN | 109059413 | | 12/2018 |
| CN | 109642768 | A | 4/2019 |
| CN | 109642769 | A | 4/2019 |
| CN | 209623184 | | 11/2019 |
| CN | 209893773 | | 1/2020 |
| DE | 640100 | A | 12/1936 |
| DE | 685189 | C | 12/1939 |
| DE | 3111595 | A1 | 10/1982 |
| DE | 4428051 | A | 2/1995 |
| DE | 69301581 | | 3/1996 |
| DE | 20021162 | | 4/2001 |
| DE | 20204297 | | 9/2002 |
| DE | 10256954 | | 10/2003 |
| DE | 10307756 | A1 | 9/2004 |
| DE | 202004016063 | U1 | 3/2006 |
| DE | 202006007926 | U1 | 8/2006 |
| DE | 20221876 | | 1/2009 |
| DE | 102012224167 | A1 | 7/2014 |
| DE | 102014200806 | A1 | 7/2015 |
| DE | 102016216126 | A1 | 3/2018 |
| DE | 102018213817 | A1 | 2/2019 |
| DE | 102017208901 | | 6/2020 |
| DE | 102019200070 | | 7/2020 |
| EP | 1152201 | A | 11/2001 |
| EP | 1162420 | A1 | 12/2001 |
| EP | 1096088 | B1 | 4/2004 |
| EP | 1492987 | | 1/2005 |
| EP | 1538409 | | 6/2005 |
| EP | 1329679 | B1 | 1/2007 |
| EP | 1873468 | | 1/2008 |
| EP | 1895085 | A2 | 3/2008 |
| EP | 1953483 | A2 | 8/2008 |
| EP | 2054684 | | 5/2009 |
| EP | 2426448 | A2 | 3/2012 |
| EP | 2430379 | A1 | 3/2012 |
| EP | 2492621 | A2 | 8/2012 |
| EP | 2562499 | A1 | 2/2013 |
| EP | 2717006 | A1 | 4/2014 |
| EP | 2738486 | A2 | 6/2014 |
| EP | 2765488 | A2 | 8/2014 |
| EP | 2896917 | | 7/2015 |
| EP | 2133641 | B1 | 11/2015 |
| EP | 2998670 | A2 | 3/2016 |
| EP | 2014200864 | A2 | 3/2016 |
| EP | 3287722 | A1 | 2/2018 |

(56) References Cited

FOREIGN PATENT DOCUMENTS

| | | | | | |
|---|---|---|---|---|---|
| EP | 2357436 | B1 | | 3/2018 | |
| EP | 2405216 | B1 | | 9/2018 | |
| EP | 2927628 | B1 | | 9/2018 | |
| EP | 2998671 | B1 | | 9/2018 | |
| EP | 3475635 | A1 | | 5/2019 | |
| EP | 2908075 | B1 | | 6/2019 | |
| FR | 1485432 | A | | 6/1967 | |
| GB | 191316555 | A | | 5/1914 | |
| GB | 2107768 | A | | 5/1983 | |
| GB | 2209794 | B | | 7/1991 | |
| JP | 52048247 | A | | 4/1977 | |
| JP | 52048248 | A | | 4/1977 | |
| JP | 52048250 | A | | 4/1977 | |
| JP | S5721169 | A | | 2/1982 | |
| JP | H02154972 | A | | 6/1990 | |
| JP | 2247479 | A | | 10/1990 | |
| JP | 2247480 | A | | 10/1990 | |
| JP | H02275278 | A | | 11/1990 | |
| JP | H0371087 | U | | 7/1991 | |
| JP | H03204581 | A | | 9/1991 | |
| JP | 3271476 | A | | 12/1991 | |
| JP | H04148180 | A | | 5/1992 | |
| JP | 4186011 | A | | 7/1992 | |
| JP | H06201253 | A | | 7/1994 | |
| JP | 7109864 | A | | 4/1995 | |
| JP | 7317441 | A | | 12/1995 | |
| JP | 9264091 | A | | 10/1997 | |
| JP | 09303943 | A | * | 11/1997 | |
| JP | 11248339 | A | | 9/1999 | |
| JP | 11324518 | A | | 11/1999 | |
| JP | 3161680 | B2 | | 4/2001 | |
| JP | 2005164230 | A | | 6/2005 | |
| JP | 4020687 | B2 | | 12/2007 | |
| JP | 2008008610 | | | 1/2008 | |
| KR | 900002711 | Y1 | * | 3/1990 | ............ F25D 23/02 |
| KR | 200166856 | Y1 | | 2/2002 | |
| KR | 2004042748 | A | | 5/2004 | |
| KR | 2005027875 | A | | 3/2005 | |
| KR | 100756464 | B1 | | 9/2007 | |
| KR | 100880487 | B1 | | 1/2009 | |
| KR | 101005189 | B1 | | 1/2011 | |
| KR | 2014111723 | A | | 9/2014 | |
| KR | 20150008763 | A | | 1/2015 | |
| TR | 199901774 | A2 | | 3/2001 | |
| TR | 200003328 | A2 | | 6/2002 | |
| TW | 200835840 | A | | 9/2008 | |
| WO | 03085339 | | | 10/2003 | |
| WO | 2015078307 | A1 | | 6/2015 | |
| WO | 2015078311 | A1 | | 6/2015 | |
| WO | 2015078313 | A1 | | 6/2015 | |
| WO | 2015078314 | A1 | | 6/2015 | |
| WO | 2015078315 | A1 | | 6/2015 | |
| WO | 2015078316 | A1 | | 6/2015 | |
| WO | 2015078317 | A1 | | 6/2015 | |
| WO | 2015107118 | A1 | | 7/2015 | |
| WO | 2016026741 | A1 | | 2/2016 | |
| WO | 2018036975 | A1 | | 3/2018 | |
| WO | 2018037038 | A1 | | 3/2018 | |

OTHER PUBLICATIONS

Notice of Allowance Issued in U.S. Appl. No. 16/328,079 dated Jul. 30, 2021.
U.S. Appl. No. 17/536,454, filed Nov. 29, 2021 titled "Refrigerating Device for a Recreational Vehicle".
AU Patent Application No. 2017316505 filed on Feb. 6, 2019.
EU Design Patent Application No. 003351253-0001 filed on Aug. 24, 2016.
EU Design Patent Application No. 003351253-0002 filed on Aug. 24, 2016.
EU Design Patent Application No. 003351253-0003 filed on Aug. 24, 2016.
EU Design Patent Application No. 003351253-0004 filed on Aug. 24, 2016.
EU Design Patent Application No. 003351253-0005 filed on Aug. 24, 2016.
EU Design Patent Application No. 003351253-0006 filed on Aug. 24, 2016.
EU Design Patent Application No. 003351253-0007 filed on Aug. 24, 2016.
EU Design Patent Application No. 003351253-0008 filed on Aug. 24, 2016.
EU Design Patent Application No. 003351253-0009 filed on Aug. 24, 2016.
EU Design Patent Application No. 003351253-0010 filed on Aug. 24, 2016.
EU Design Patent Application No. 003351253-0011 filed on Aug. 24, 2016.
EU Design Patent Application No. 003351253-0012 filed on Aug. 24, 2016.
EU Design Patent Application No. 003351253-0013 filed on Aug. 24, 2016.
EU Design Patent Application No. 003351253-0014 filed on Aug. 24, 2016.
EU Design Patent Application No. 003351253-0015 filed on Aug. 24, 2016.
EU Design Patent Application No. 003351253-0016 filed on Aug. 24, 2016.
EU Design Patent Application No. 003351444-0001 filed on Aug. 24, 2016.
EU Design Patent Application No. 003351444-0002 filed on Aug. 24, 2016.
EU Design Patent Application No. 003351444-0003 filed on Aug. 24, 2016.
EU Design Patent Application No. 003351444-0004 filed on Aug. 24, 2016.
EU Design Patent Application No. 003351444-0005 filed on Aug. 24, 2016.
EU Design Patent Application No. 003351444-0006 filed on Aug. 24, 2016.
EU Design Patent Application No. 003351444-0007 filed on Aug. 24, 2016.
EU Design Patent Application No. 003351444-0008 filed on Aug. 24, 2016.
EU Design Patent Application No. 003351444-0009 filed on Aug. 24, 2016.
EU Design Patent Application No. 003351444-0010 filed on Aug. 24, 2016.
CN Notice of Grant the Patent Right for Design Application received in 201730050701.0 dated Nov. 17, 2017.
CN First Office Action for Design Application received in 201730050701.0 dated Jul. 7, 2017.
Requirement for Restriction/Election issued in U.S. Appl. No. 29/594,930 dated Jan. 26, 2018.
Notice of Allowance issued in U.S. Appl. No. 29/594,930 dated Sep. 6, 2018.
U.S. Appl. No. 29/641,674 entitled "Control Panel" filed Mar. 23, 2018.
Non-Final Office Action issued in U.S. Appl. No. 29/594,936 dated Oct. 19, 2018.
Notice of Allowance issued in U.S. Appl. No. 29/594,936 dated Jan. 10, 2019.
CN Notice of Granting Patent Right for Design Application received in 201730050365.X dated Jun. 2, 2017.
DE Patent Application No. 102019209297.7 filed on Jun. 26, 2019.
DE Patent Application No. 102019207919.9 filed on May 29, 2019.
Non-Final Office Action issued in U.S. Appl. No. 16/327,492 dated Jun. 27, 2019.
European Patent Office, International Search Report and Written Opinion for PCT/EP2017/071216 dated Nov. 11, 2017.
European Patent Office, European Search Report and Opinion for 16185380.9 dated Feb. 17, 2017.
Dometic Product Catalog, Refrigerators, 2015.
Dometic Product Catalog, Refrigerators, 2016.
Notice of Allowance issued in U.S. Appl. No. 16/327,492, dated Feb. 5, 2020.

(56) References Cited

OTHER PUBLICATIONS

Intention to Grant dated Jan. 31, 2020 for EP Application No. 16185380.9 filed on Aug. 23, 2016 entitled "Cabinet for a Recreational Vehicle".
Corrected Notice of Allowance issued in U.S. Appl. No. 16/327,492, dated Apr. 10, 2020.
Office Action for Germany Patent Application No. 102019207919.9 dated Mar. 4, 2020.
Office Action for Germany Patent Application No. 102019209297.7 dated Mar. 12, 2020.
Corrected Notice of Allowance issued in U.S. Appl. No. 16/327,492, dated May 13, 2020.
Decision to Grant mailed in EP Patent Application No. 16185380.9 dated Jun. 18, 2020.
Office Action for China Patent Application No. 201780051244.4 dated Jun. 17, 2020.
U.S. Appl. No. 16/198,009, filed Nov. 21, 2018 titled Molded Frame for a Reversible Appliance Door.
U.S. Appl. No. 63/034,128, filed Jun. 3, 2020 titled Refrigerator.
Design U.S. Appl. No. 29/715,466, filed Dec. 2, 2019 titled Refrigerator Appliance.
Rejection Decision Issued in China Application No. 201780051244.4 dated Jan. 10, 2022.
Decision to Grant Issued in German Patent Application No. 102019209297.7 dated Feb. 2, 2022.
Office Action Issued in German Application No. 102019207919.9 dated Dec. 22, 2021.
Office Action Issued in European Patent Application No. 17758842.3 dated Feb. 16, 2022.
Examination Report Issued in Australian Patent Application No. 2017317557 dated Apr. 7, 2022.
Examination Report Issued in Australian Patent Application No. 2017316505 dated Apr. 28, 2022.
Notice of Allowance Issued in U.S. Appl. No. 17/536,454 dated Sep. 23, 2022.
Corrected Notice of Allowance Issued in U.S. Appl. No. 17/536,454 dated Oct. 7, 2022.
Corrected Notice of Allowance Issued in U.S. Appl. No. 17/536,454 dated Nov. 21, 2022.
Notice of Acceptance Issued in Australian Patent Application No. 2017317557 dated Dec. 13, 2022.
Office Action for EP Patent Application No. 177588423 dated Jul. 13, 2020.
Office Action for China Patent Application No. 2017800518667 dated Aug. 24, 2020.
Non Final Office Action for Design U.S. Appl. No. 29/641,674 dated Oct. 1, 2020.
Non-Final Office Action issued in U.S. Appl. No. 16/328,079 dated Jun. 5, 2020.
U.S. Appl. No. 16/328,079 entitled "Refrigerating device for a recreational vehicle" filed on Feb. 25, 2019.
U.S. Appl. No. 16/327,492 entitled "Cabinet for a Recreational Vehicle" filed on Feb. 22, 2019.
U.S. Appl. No. 29/594,930 entitled "Control Panel" filed on Feb. 23, 2017.
U.S. Appl. No. 29/594,936 entitled "Refrigerator" filed on Feb. 23, 2017.
European Patent Office, International Preliminary Report on Patentability for PCT/EP2017/071216 dated Feb. 26, 2019.
European Patent Office, International Preliminary Report on Patentability for PCT/EP2017/071052 dated Feb. 26, 2019.
European Design Patent Application No. 003351253 filed Aug. 24, 2016.
European Design Patent Application No. 003351444 filed Aug. 24, 2016.
Transmittal Letter of Related Cases dated May 15, 2017.
Final Office Action issued in U.S. Appl. No. 16/328,079 dated Nov. 24, 2020.
Advisory Action issued in U.S. Appl. No. 16/328,079 dated Mar. 10, 2020.
Non Final Office Action issued in U.S. Appl. No. 16/328,079 dated Apr. 5, 2021.
Second Office Action issued in China Patent Application No. 201780051244.4 dated Feb. 19, 2021.
Notice of Acceptance Issued in Australian Patent Application No. 2017316505 dated Mar. 23, 2023.
U.S. Appl. No. 18/163,043 entitled "Refrigerating Device for a Recreational Vehicle" filed Feb. 1, 2023.
Corrected Notice of Allowance Issued in U.S. Appl. No. 17/536,454 dated Jan. 9, 2023.
AU Patent Application No. 2023200249 titled "Refrigerating device for a recreational vehicle" filed on Jan. 18, 2023.
Non Final Office Action Issued in U.S. Appl. No. 18/163,043 dated May 15, 2023.
Patent Certificate issued in AU Application No. 2017317557 dated Apr. 6, 2023.
Notice of Allowance Issued in U.S. Appl. No. 18/163,043 dated Aug. 23, 2023.
International Search Report for PCT Application PCT/EP2005/011469 dated Mar. 2, 2006.
Notification to Grant Patent Right for Invention Mailed in CN Patent Application No. 201710701905.5 dated Dec. 5, 2019.
Notice of Allowance mailed in U.S. Appl. No. 15/998,459 dated Dec. 16, 2019.
Non-Final Office Action mailed in U.S. Appl. No. 15/998,459 dated Jun. 17, 2019.
Design review, "Mobile living made easy," Dometic, CF 45, pp. 11 (Mar. 23, 2017).
First Office Action mailed in CN Patent application No. 201710701905.5 dated Jul. 3, 2019.
Reversing Frigidaire Top Freezer Refrigerator Door, retrieved from Internet URL: http://www.applianceaid.com/reversing-frigidaire-top-freeezer-refrigerator-door.php, on Jan. 15, 2019, pp. 8.
Reversing the Instructions Door Swing retrieved from Internet URL: http://www.homedepot.com/catalog/pdfImages/0b/Ob70c905-3df3-4445-ba23-52ee1417a589.pdf, on Jan. 15, 2019, pp. 4.
Dometic 2015 Product Catalog—Refrigerators.
Dometic 2016 Product Catalog—Refrigerators.
U.S. Appl. No. 16/198,009 "Molded Frame for a Reversible Appliance Door" filed Nov. 21, 2018.
Notice of Allowance mailed in U.S. Appl. No. 15/998,459 dated Feb. 11, 2020.
Office Action issued in DE Application No. 102018213817.6 dated Jan. 17, 2023.
Examination Report issued in AU Application No. 2018217298 dated May 24, 2023.
Notice of Acceptance issued in AU Application No. 2018217298 dated Jul. 27, 2023.
Notice of Grant issued in AU Application No. 2018217298 dated Nov. 23, 2023.
Non-Final Office Action issued in U.S. Appl. No. 16/839,782 dated Jun. 25, 2020.
Notice of Allowance issued in U.S. Appl. No. 16/839,782 dated Oct. 9, 2020.
Notice of Grant issued in Australian Patent Application No. 2017316505 dated Jul. 20, 2023.
Office Action issued in EP Application No. 17758842.3 dated Dec. 5, 2023.
AU Application No. 2005318665 titled "Cooling appliance" filed on May 31, 2007.
U.S. Appl. No. 11/722,240 titled "Cooling appliance" filed on Jun. 20, 2007.
Non-Final Office Action issued in U.S. Appl. No. 11/722,240 dated May 13, 2010.
Final Office Action issued in U.S. Appl. No. 11/722,240 dated Sep. 7, 2010.
Non-Final Office Action issued in U.S. Appl. No. 11/722,240 dated Feb. 4, 2011.
Final Office Action issued in U.S. Appl. No. 11/722,240 dated Jun. 8, 2011.
Advisory Action issued in U.S. Appl. No. 11/722,240 dated Oct. 18, 2011.

(56) References Cited

OTHER PUBLICATIONS

Notice of Allowance issued in U.S. Appl. No. 11/722,240 dated Jan. 30, 2012.
EP Application No. 05799107.7 titled "Cooling appliance" filed on Oct. 26, 2005.
Office Action issued in EP Application No. 05799107.7 dated Apr. 2, 2008.
Office Action issued in EP Application No. 05799107.7 dated Jun. 4, 2009.
Office Action issued in EP Application No. 05799107.7 dated Jan. 29, 2016.
Office Action issued in EP Application No. 05799107.7 dated Apr. 16, 2018.
Intention to Grant issued in EP Application No. 05799107.7 dated Nov. 20, 2018.
Decision to Grant issued in EP Application No. 05799107.7 dated Apr. 4, 2019.
CN Application No. 201410011202.6 titled "Refrigerator" filed on Jan. 9, 2014.
Notice of Grant issued in CN Application No. 201410011202.6 mailed on Jul. 8, 2016.
CN Application No. 202020940884.X titled "Hinge mechanism, compartment door assembly, cabinet or refrigerator and recreational vehicle" filed on May 29, 2020.
Office Action issued in CN Application No. 202020940884.X mailed on Mar. 24, 2021.
Notice of Grant issued in CN Application No. 202020940884.X mailed on May 20, 2021.
Registration Certificate issued in CN Application No. 202020940884.X mailed on Jun. 15, 2021.
Examination Report issued in AU Application No. 2023200249 mailed on Mar. 14, 2024.
Office Action issued in DE Application No. 102019207919.9 mailed on Mar. 13, 2024.

* cited by examiner

HINGE MECHANISM, COMPARTMENT DOOR ASSEMBLY WITH SUCH A HINGE MECHANISM, CABINET OR REFRIGERATOR WITH SUCH A HINGE MECHANISM AND/ OR COMPARTMENT DOOR ASSEMBLY AND RECREATIONAL VEHICLE

The present embodiments relate to a hinge mechanism, a compartment door assembly with such a hinge mechanism and a cabinet or refrigerator with such a hinge mechanism and/or compartment door assembly. Finally, the present embodiments also relate to a recreational vehicle provided with at least one of the above devices.

In general, known hinge mechanisms for supporting a door to a housing of a cabinet or refrigerator, particularly provided for a recreational vehicle, in order to be able to pivot the about two distinct pivoting axes with respect to the housing have a quite complex structure. An example for an according a hinge mechanism is described in EP 3 287 722 A1. Although such complex implementations for corresponding hinge mechanisms has proven their functionality quite well, there is still a demand in improving them further with regard to reduced complexity and thus reliability, production costs as well as maintenance expense. In particular, there is the demand for providing an implementation of a corresponding hinge mechanism having a quite simple structure.

In particular, the present embodiments is directed to provide a solution for the above problems with regard to compartments and/or compartment door assemblies in cabinets or refrigerators. Such compartments often are provided in cabinets or refrigerators resulting from dividing the interior space of the cabinets or refrigerators in various sections. An example for a corresponding compartment would be a freezer in a refrigerator. Often, such compartments, are provided with separate compartment doors in addition to the main door of the cabinet or refrigerator. These compartment doors in particular are positioned behind the main door, when the main door is closed, such that the compartment door cannot be opened in this operation state. Accordingly, such compartment doors for example have not to be provided with an own locking arrangement preventing an autonomous opening of the compartment door when the main door is closed. In addition to this difference, other spatial restrictions apply for such compartment door assemblies.

Accordingly, the problem to be solved is to provide a hinge mechanism having a quite simple but reliable structure and in particular being provided for a compartment door assembly.

Besides, there is a demand for a corresponding compartment door assembly and a cabinet or refrigerator having a simplified structural configuration. Finally, there is a demand for recreational vehicles benefiting from the advantages achieved by such devices.

The above problems are solved by the subject matter of the accompanying independent claims. Further advantageous features for the corresponding subject matters are provided in the accompanying dependent claims.

According to a first aspect, a hinge mechanism for supporting a compartment door pivotally to a frame and/or a housing of a cabinet or a refrigerator comprises at least two receiving sections and at least two engaging sections. This configuration in particular is provided for a recreational vehicle like a motor home or caravan. The hinge mechanism is characterized in that each of the receiving sections is configured to be coupled to one of the compartment door and the frame respectively the housing of the cabinet or refrigerator. Furthermore, each of the engaging sections is configured to be coupled to the other of the compartment door and the frame respectively the housing. Each of the engaging sections is configured to be engaged with and disengaged from one of the receiving sections. In the engaged state each engaging section is pivotable with respect to the corresponding receiving section about a corresponding pivoting axis.

This configuration allows to move the compartment door between a closed state of the compartment door to two distinct opened states of the compartment door, when a main door of the cabinet or refrigerator, respectively, is in the opened state. In a first opened state, the compartment door is pivoted with respect to the frame or housing about one pivoting axis extending along the left side of the frame or housing and being defined by at least one of the engaging sections. In a second opened state, the compartment door is pivoted with respect to the frame or housing about another pivoting axis extending along the right side of the frame or housing and being defined by at least the other one of the engaging sections. In contrast to hinge mechanisms for main doors of a cabinet or refrigerator, there is no need for providing a locking arrangement for the hinge mechanism of the compartment door assembly as in the closed and in particular locked state of the main door, the compartment door cannot be opened anyway. This configuration is very simple and thus reliable and cheap.

The hinge mechanism comprises at least four receiving sections and at least four engaging sections. In the first opened state, the compartment door is pivoted with respect to the frame or housing about one pivoting axis extending along the left side of the frame or housing and being defined by at least two of the engaging sections. In the second opened state, the compartment door is pivoted with respect to the frame or housing about the other pivoting axis extending along the right side of the frame or housing and being defined by at least the two other of the engaging sections. Then, each of the pivoting axes extends through at least two engaging sections. Hence, this allows for a stable and reliable pivoting operation of the compartment door.

According to one embodiment each of the engaging sections has a pin portion and each of the receiving section has a receiving portion configured to receive the pin portion of the respective engaging section along a direction perpendicular with respect to its pivoting axis.

Such a pin engagement configuration is quite simple resulting in a highly reliable and cheap implementation for the hinge mechanism.

Further, according to one embodiment, the pin portions are provided as longitudinal members having a non-rotational symmetric configuration with respect to its pivoting axis along the longitudinal direction of the pin portion. The pin portion is formed such that the engaging section can be pivoted in the engaged state with the corresponding receiving section about the respective pivoting axis between a locked state and an unlocked state. In the unlocked state the respective pin portion can be moved along the direction perpendicular with respect to the respective pivoting axis to be disengaged from the corresponding receiving section. In the locked state, the respective pin portion only can be rotated about its pivoting axis with respect to the corresponding receiving section.

For example, the pin portions are provided with a nearly tubular shape having two flattened surfaces on opposite sides of the pin portion seen perpendicular with respect to the longitudinal axis of the pin portion. This structural implementation is very suitable for realizing the above described functionality allowing to engage and disengage the receiving sections with/from the engaging sections reliably permitting the pivotal movement of the engaging sections with respect to the respective receiving sections in the engaged state.

According to one embodiment, each of the engaging sections forms with the corresponding one of the receiving sections an open bracket hinge.

"Open bracket hinge" in particular means that the receiving section has a c-shaped member and that the engaging section is formed such that the engaging section can be engaged with and disengaged from the receiving section through the opening in the receiving section. In particular, the engaging section is formed, as for example described above, such that the engaging section just can be engaged with and disengaged from the receiving section in specific rotational orientations between the respective engaging section and the corresponding receiving section. Such a configuration is quite simple and practical.

According to some embodiments, the receiving sections at least partially are made of an elastic material. Examples for such elastic materials are synthetic materials, rubber or metals. In addition thereto or alternatively, the receiving sections are provided with biasing members biasing the receiving sections from a configuration, in which the engaging sections can be freely engaged with and disengaged from the corresponding receiving sections towards a configuration, in which the engaging sections are restrained within the corresponding receiving sections.

These features enable various different configurations allowing an engaging and disengaging of the engaging sections with the receiving sections. In these configurations, there is no need for pivoting the engaging sections into a specific rotational orientation with respect to the receiving sections to be engaged with and disengaged from the corresponding receiving section. In contrast thereto, only a specific amount of pulling force, resulting in a widening of the opening provided in the receiving sections, has to be applied to engage or disengage the respective engaging sections with/from the receiving sections. Such a configuration is highly reliable and flexible.

According to some embodiments, the hinge mechanism comprises at least four receiving sections and at least four engaging sections, wherein at least two receiving sections are provided on a common coupling section such that the pivoting axes defined by the respective receiving sections correspond with each other or at least are in parallel with each other but shifted transversally with respect to each other and/or at least two engaging sections are provided on a common coupling section such that the pivoting axes defined by the respective engaging sections correspond with each other or are in parallel with each other but shifted transversally with respect to each other. In particular all receiving sections or engaging sections are provided on a common coupling sections for the receiving sections or for the engaging sections in such a manner that they are defining two parallel main pivoting axes per coupling section.

Such coupling sections facilitate a coupling of the various components of the hinge mechanism to the compartment door or and frame respectively the housing of the cabinet or refrigerator, as not each single engaging section or receiving section has to be coupled thereto one by one. The coupling sections in particular can have further functions than only coupling the corresponding components of the hinge mechanism to each other. For example, a coupling section can be provided as a removable shelf for the cabinet or refrigerator forming the compartment when inserted into the housing of the cabinet or refrigerator. In such a configuration two receiving sections or engaging sections are provided on the coupling sections having parallel but transversely shifted (with respect to each other) pivoting axes. Alternatively, the coupling sections for example can be provided formed integrally with or coupled to the compartment door of the cabinet or refrigerator. In such a configuration, the coupling section (i.e. the compartment door) is provided with four receiving sections or engaging sections, wherein two of the engaging sections are provided along one first main pivoting axis along one side (for example along the right side) of the compartment door and two engaging sections are provided along a second main pivoting axis, parallel with but transversally shifted with respect to the first main pivoting axis, along the other side (for example along the left side) of the compartment door. Such coupling sections result in a simplified overall configuration and in particular a simplified assembling process.

According to another aspect, a compartment door assembly for an internal compartment of a cabinet or a refrigerator, particularly provided for a recreational vehicle, comprises a compartment door and a hinge mechanism configured to couple the compartment door to a frame or a housing of the cabinet or refrigerator, respectively. The compartment door assembly is characterized in that the hinge mechanism is one of the above described hinge mechanisms.

Such a configuration allows the compartment door assembly to benefit from the above described advantages of the above described hinge mechanisms.

According to one embodiment, the compartment door assembly further comprises a compartment frame configured to be coupled to the housing of the cabinet or refrigerator, wherein the hinge mechanism couples the compartment door to the compartment frame.

Such a compartment frame can be formed integrally with at least some of the engaging or receiving sections of the hinge mechanism and facilitates coupling the hinge mechanism to the housing of the cabinet or refrigerator, respectively.

Further, according to one embodiment, all of the receiving sections of the hinge mechanism are provided on one of the compartment frame or the compartment door forming two parallel and transversally shifted (with respect to each other) main pivoting axes along two opposing sides of the one of the compartment frame and the compartment door. In particular all of the receiving sections are provided on the compartment frame. All of the engaging sections of the hinge mechanism are provided on the other one of the compartment frame and the compartment door forming two parallel and transversally shifted (with respect to each other) main pivoting axes along the two opposing sides of the other one of the compartment frame and the compartment door. In particular all of the engaging sections are provided on the compartment door.

Such a configuration is quite practical and clearly structured, resulting in a simplified and reliable overall configuration.

According to the some embodiments, the compartment door assembly is configured to be movable from a first operation state to a second operation state or to a third operation state. In the first operation state the compartment door can seal a compartment and each of the provided engaging sections is engaged with its corresponding receiving section. In the second operation state the compartment door cannot seal a compartment and only some, in particular the half, of the engaging sections are engaged with its corresponding receiving sections. In the third operation state the compartment door cannot seal the compartment and only the other (half) of the engaging sections are engaged with its corresponding receiving sections.

With this configuration, the compartment door is configured to be moved between one closed and two different opened states, resulting in a high flexibility of the operation of the compartment door. This is of specific advantage, when a main door of the cabinet or refrigerator also is configured to be moved between one closed and two different opened operation states. For the first opened state the compartment door is pivoted with respect to the cabinet or refrigerator about a first main pivoting axis on the right side of the compartment door. For the second opened state the compartment door is pivoted with respect to the cabinet or refrigerator about a second main pivoting axis on the left side of the compartment door. Thus, the compartment door can be moved in harmony with the main door of the cabinet or refrigerator resulting in an improved functionality of the compartment door assembly.

According to some embodiments, the compartment door assembly is configured such that the compartment door can be fully disengaged by simultaneously disengaging all of the engaging sections from its respective receiving sections.

In other words, the compartment door assembly is configured to be moved into a third opened state in which the compartment door is fully disassembled from the compartment frame, if provided. Such a functionality is highly useful in various situations, e.g. when cleaning the compartment or the compartment door.

According to some embodiments, the receiving sections and/or the engaging sections are formed integrally with the compartment door and/or if provided with the compartment frame.

For example, all engaging sections are formed integrally with the compartment door. Such implementations result in a practical and well-structured overall configuration. In particular, the respective receiving sections or engaging sections can be cast as one-piece members together with the corresponding compartment door or compartment frame, respectively.

According to one embodiment, the compartment door has at least two separate handles configured to be operated to move the compartment door with respect to at least a part of the hinge mechanism (for example with respect to some of the receiving sections). In particular, the handles are provided in the form of gripping apertures provided in a front surface of the compartment door.

With such handles, the compartment door can easily be moved from the closed state to any one of the different opened states depending on the choice of the handle which is operated/pulled. In other words, when operating the first handle, for example a left handle of the compartment door, the compartment door moves about a first main pivoting axis, for example provided along the right side of the compartment door, into the first opened state. When operating the second handle, for example a right handle of the compartment door, the compartment door moves about a second main pivoting axis, for example provided along the left side of the compartment door, into the second opened state. Such a configuration is quite simple and functional.

According to some embodiments, the compartment door assembly is configured to seal a freezer of a refrigerator, the freezer being in particular removable.

Such a freezer is a very suitable choice for a compartment of a refrigerator or cabinet. A removable freezer in particular has a removable shelf configured to be arranged in the interior of the refrigerator to form the compartment depicting the freezer.

According to a further aspect, a cabinet or refrigerator, particularly provided for a recreational vehicle, comprises a housing and at least one main door. The housing has side walls (in particular four), a top wall and a bottom wall. The walls are forming an interior space having at least one separate compartment. A front opening is provided in one of the side walls. The at least one main door is configured to seal the front opening of the housing. The cabinet or refrigerator is characterized in that the cabinet or refrigerator, respectively, further comprises at least one of the above described compartment door assemblies and/or at least one of the above described hinge mechanisms coupling a compartment door to the housing, in particular via a separate compartment frame.

Such a cabinet or refrigerator benefits from the above described advantages obtained by the corresponding structural features of the above described devices.

According to a further aspect, a recreational vehicle is provided with at least one of the above described devices.

Such a recreational vehicle benefits from the above described advantages obtained by the corresponding structural features of the above described devices.

A more complete appreciation of the present invention and many of the attendant advantages thereof will be readily obtained as the same become better understood by reference to the following detailed description when considered in connection with the accompanying drawings, wherein.

Various embodiments will now be described with reference to the accompanying drawings, wherein identical reference numerals designate identical elements throughout the various drawings.

Figure 1:
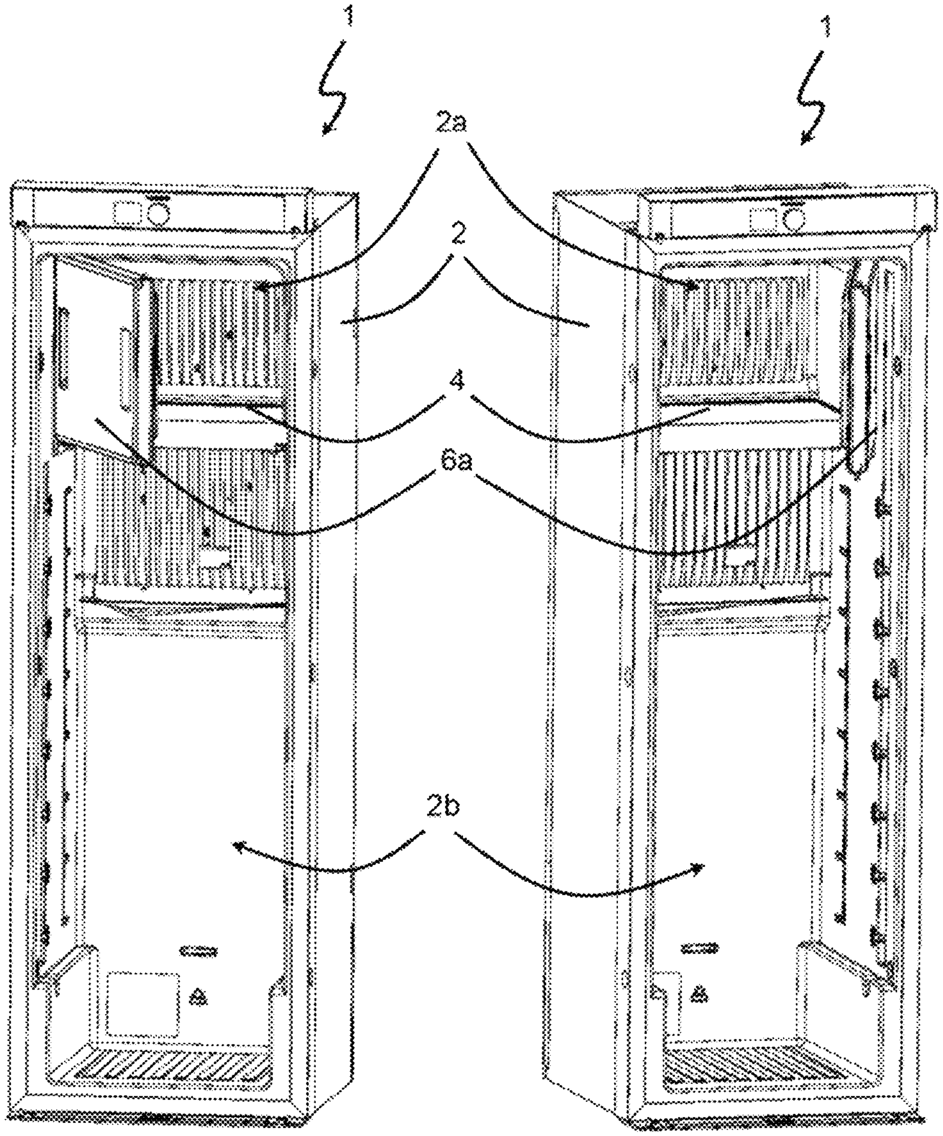
FIG. 1 shows a partially disassembled (without a main door) refrigerator in two different opened states for the compartment door coupled to the housing by an exemplary hinge mechanism.
Figure 2:
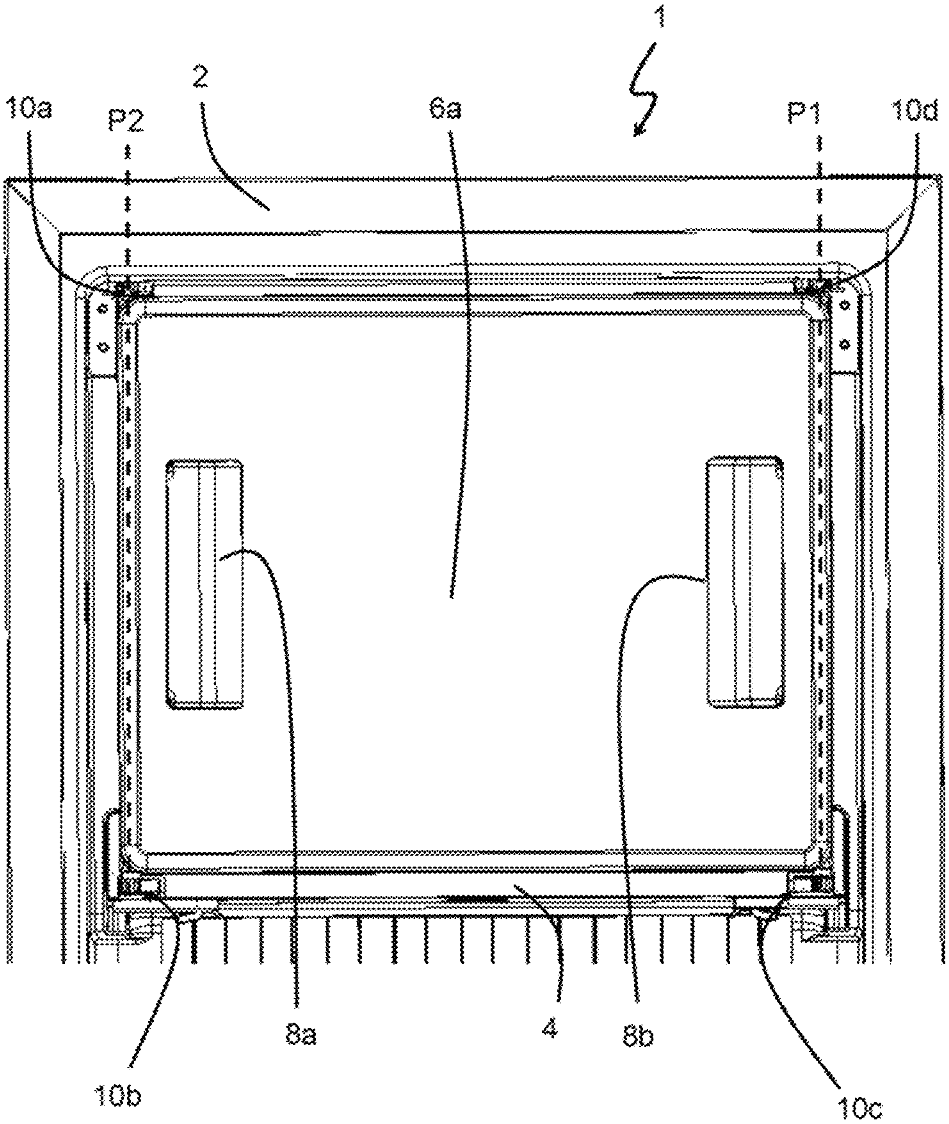
FIG. 2 shows an enlarged spatial view of the refrigerator of FIG. 2 in a closed state for the compartment door.

FIGS. 1 and 2 depict various illustrations of a partially disassembled refrigerator 1 according to an exemplary embodiment of the present invention. The refrigerator has a housing 2 defined by four side walls, a top wall and a bottom wall forming an interior space of the housing 2. In one side wall of the housing 2, here in the front wall of the housing, there is provided a front opening connecting the interior space of the housing 2 with its environment. Conventionally or in the fully assembled state, respectively, the refrigerator 1 has a main door (not shown) coupled to the housing 2 and configured to be moved between a closed and an opened state to seal and to open the front opening. The interior space of the housing 2 is separated by a removable shelf 4 into two different internal compartments, an upper compartment 2*a* and a lower compartment 2*b*. The refrigerator 1 further comprises a compartment door 6*a*, which is a part of a compartment door assembly 6 illustrated in FIGS. 3A and 3B, coupled to the housing 2 via the hinge mechanism 10 described later with reference to FIGS. 3A and 3B.

The hinge mechanism 10 allows to move the compartment door 6*a* between a closed state, which is illustrated in FIG. 2, and two different opened states, which are illustrated in FIG. 1. The compartment door 6*a* is provided with two handles 8*a* and 8*b* formed as gripping apertures in the front surface of the compartment door 6*a*. One of the two handles is provided along a left side of the compartment door 6*a* while the other of the two handles 8*a* and 8*b* extends along a right side of the compartment door 6*a*.

As described later with reference to FIGS. 3A and 3B, the hinge mechanism 6*a* is configured such that the compartment door 6*a* can be moved from a closed state of the compartment door 6*a* (see. FIG. 2) to a first opened state illustrated on the right side of FIG. 1 and a second opened state illustrated on the left side of FIG. 2. In particular, by operation the left handle 8*a* the compartment door 6*a* is disengaged from the housing 2 at its left side and pivots with respect to the housing 2 along a first main pivoting axis P1 extending along the right side of the compartment door 6 and of the housing 2 into the first opened state illustrated on the right side of FIG. 1. By operation the right handle 8*b* the compartment door 10 is disengaged from the housing 2 at its right side and pivots with respect to the housing 2 along a second main pivoting axis extending along the left side of the compartment door 6*a* and of the housing 2 into the second opened state illustrated on the left side of FIG. 1. Finally, the hinge mechanism 10 is configured such that by simultaneously operating both handles 8*a* and 8*b*, the compartment door 6*a* is fully disengaged from the housing 2.

The concrete structural configuration of the hinge mechanism 10 to be able to implement these functions will now be described with reference to FIGS. 3A and 3B.

Figure 3A:
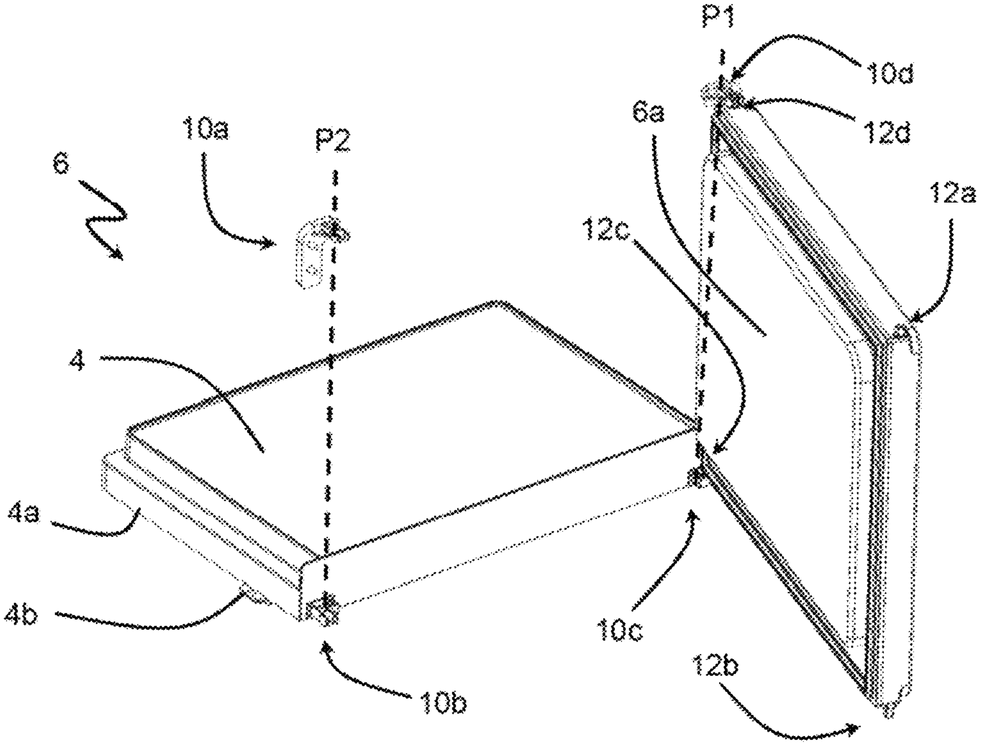
FIGS. 3A and 3B show various spatial sectional views a compartment door assembly having a hinge mechanism of FIGS. 1 and 2.
Figure 3B:
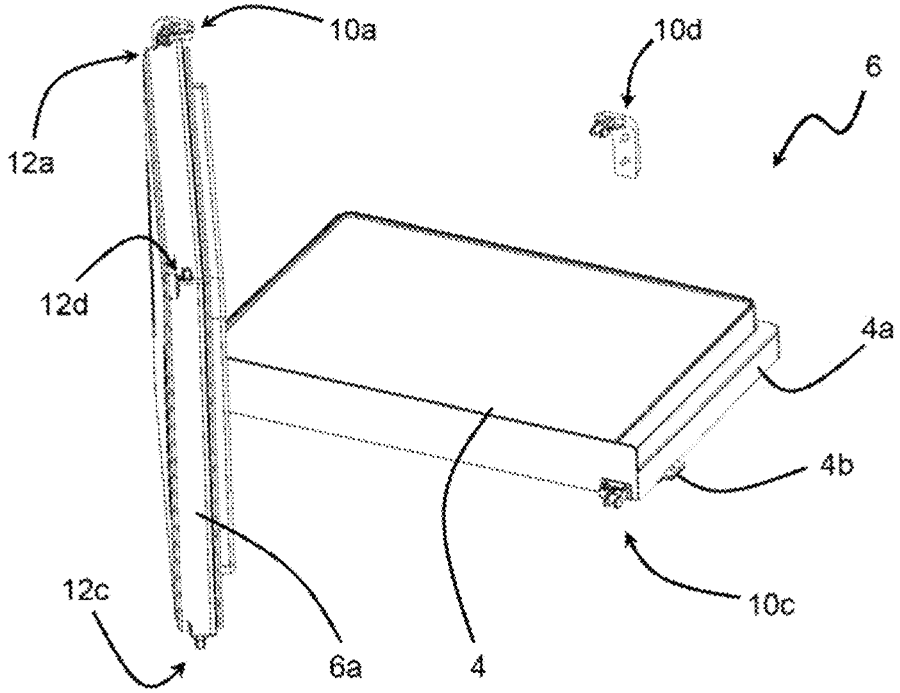

FIGS. 3A and 3B show the compartment door assembly 6 of the refrigerator 1 disassembled from the housing 2 of the refrigerator 1 illustrated in FIGS. 1 and 2.

FIG. 3A illustrates the compartment door assembly in the first opened state while FIG. 3B shows the compartment door assembly in the second opened state.

In this exemplary embodiment, the compartment door assembly 6 comprises the removable shelf 4 depicting here a compartment (sub) frame and the compartment door 6*a*. The removable shelf 4 is provided with a coupling protrusion 4*a* configured to be engaged with coupling recesses (not shown) provided on an inner side of the side walls of the housing 2 to divide the interior space of the refrigerator 1 into the two separate compartments 2*a* and 2*b*. The removable shelf 4 further comprises a locking member 4*b* configured to be releasably engaged with a corresponding locking recess (not shown) provided on the inner side of the side walls of the housing to lock the removable shelf 4 in a fully engaged condition with respect to the housing 2.

The compartment door assembly 6 further comprises a hinge mechanism according to some embodiments.

The hinge mechanism has four receiving sections 10*a* to 10*d*, wherein in the illustrated embodiment, a second receiving section 10*b* and a third receiving section 10*c* are coupled to the removable shelf 4 depicting a compartment (sub) frame as well as a coupling section between these two receiving sections 10*b* and 10*c*. A first receiving section 10*a* and a fourth receiving section 10*d* are provided independently from the removable shelf 4. Each of the receiving sections 10*a* to 10*d* has its own coupling portion 10*aa* to 10*da* (some of which are not shown for sake of brevity) and a receiving portion 10*ab* to 10*db* (some of which are not shown for sake of brevity). The coupling portions are provided in a plate like shape having several mounting bores to be coupled by corresponding fixing members to the housing 2 and/or the removable shelf 4 of the refrigerator. Although, in the illustrated embodiment the second and the third receiving sections 10*b* and 10*c* are coupled via corresponding fixing members (not illustrated) to the removable shelf 4, also configurations in which these receiving sections 10*b* and 10*c* are formed integrally with the removable shelf 4 are possible. In such a configuration, the removable shelf 4 with the coupling protrusion 4*a* and the locking member 4*b* serve as coupling portions 10*ba* and 10*ca* (some of which are not shown for sake of brevity) as well as the fixing members.

The hinge mechanism further has four engaging sections 12*a* to 12*d* (some of which are not shown for sake of brevity) provided in the illustrated embodiment as formed integrally with the compartment door 6*a*. Alternatively, the four engaging section 12*a* to 12*d* also could be provided with coupling sections (not shown) configured to be coupled to the compartment door 6*a*, for example via separate fixing members or directly. Each of the engaging sections 12*a* to 12*d* is assigned one of the receiving sections 10*a* to 10*d* and has a pin portion 12*ab* to 12*db* configured to be engaged with and disengaged from the receiving portion 10*ab* to 10*db* of its corresponding receiving section 10 *a* to 10*d*.

The concrete structural configuration of the receiving sections 10*a* to 10*d* (in particular of their receiving portions 10*ab* to 10*db*) and of the engaging sections 12*a* to 12*d* (in particular of their pin portions 12*ab* to 12*db* will now be described in view of FIG. 4.

Figure 4:
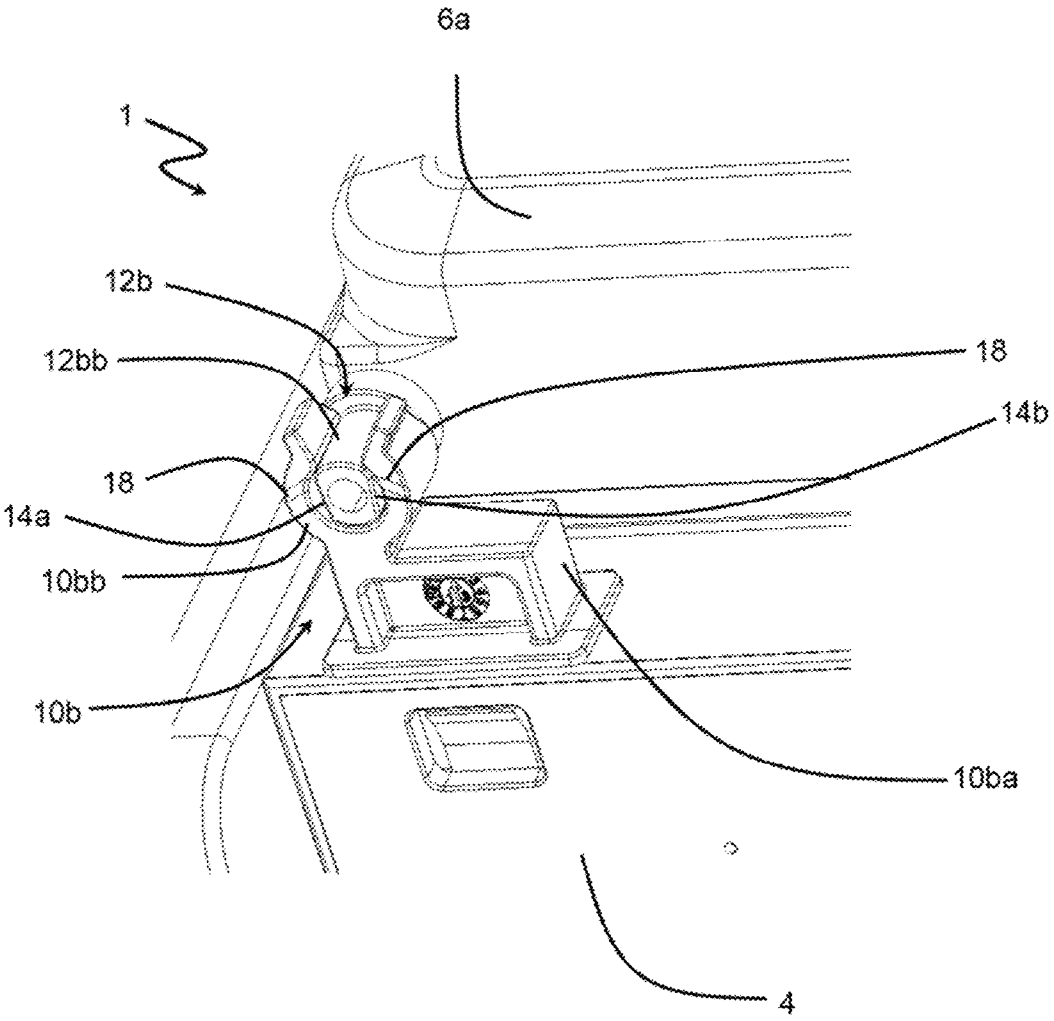
FIG. 4 shows a partially enlarged spatial view of the refrigerator shown in FIGS. 1 and 2.

While FIG. 4 only shows an enlarged view of the second receiving section 12*b* and of its corresponding engaging section 12*b* (provided on the lower left side of the drawings) in an engaged state this structure can be transferred to all of the other receiving sections 10*a*, 10*c* and 10*d*, as well as to the respective engaging sections 12*a*, 12*c* and 12*d*, respectively, at least with regard to the receiving portions 10*ab* to 10*ad* (some of which are not shown for sake of brevity) and with regard to the pin portions 12*ab* to 12*db* (some of which are not shown for sake of brevity) as the various receiving portions 10*ab* to 10*db* correspond to each other and the various pin portions 12*ab* to 12*db* correspond to each other in the illustrated embodiment. However, also other implementations having varying receiving portions and pin portions are possible.

The pin portions 12*ab* to 12*db* are formed as longitudinal members here in the form of nearly tubular cylinders. However, the pin portions 12*ab* to 12*db* are provided in a non-rotational symmetric configuration, which in the present embodiment is achieved by two flattened surfaces 14*a* and 14*b* provided on the pin portions 12*ab* to 12*db*. The receiving portions 10*ab* to 10*db* are formed as c-shaped members, such that each engaging portion 10*ab* to 10*db* (respectively each receiving section 10*a* to 10*d*) forms with the respective pin portion 12*ab* to 12*db* (respectively each engaging section 12*a* to 12*d*) an opened bracket hinge.

In detail, the pin portions 12*ab* to 12*db* are configured to be engaged with and disengaged from the respective receiving portions 10*ab* to 10*db* along an engagement direction perpendicular with respect to a longitudinal direction of the respective pin portion 12*ab* to 12*db* and the respective engaging portion 10*ab* to 10*db* (corresponding to the respective pivoting axis thereof). In dependency of the rotational orientation of the pin portions 12*ab* to 12*db* the pin portions 12*ab* to 12*db* can be engaged with or disengaged from the receiving portions 10*ab* to 10*db* or not. In FIG. 4, the pin portion 12*bb* is oriented in a first orientation with respect to the receiving portion 10*bb*, in which the pin portion 12*bb* can be engaged with or disengaged from the receiving portion 12*bb*. Such an operation state corresponds to an unlocked state in this description. The pin portion 10*bb* is in this unlocked state in the closed state of the compartment door 6*a*. When the compartment door 6*a* is moved from the closed state (illustrated in FIG. 4) to one of the two opened states (illustrated in FIGS. 3A and 3B) the pin portions 10*ab* to 10*db*, which are not disengaged from the respective receiving portions 12*ab* to 12*db*, pivot within the respective receiving portions 12*ab* to 12*db* about its corresponding pivoting axis P1 or P2. In such a rotated state, which is called the unlocked state, the pin portions 12*ab* to 12*db* which are still engaged with its corresponding receiving portions 10*ab* to 10*db* cannot be disengaged along the engaging direction perpendicular with respect to the corresponding pivoting axis P1 or P2 from the corresponding receiving portions 10*ab* to 10*db*.

Alternatively or in addition thereto, the receiving portions 10*ab* to 10*db* can be made at least partially of an elastic material to be deformable. For example, the receiving portions 10*ab* to 10*db* can be provided with an insert 18 made of rubber or another elastically deformable material. Thus, an engaging and a disengaging operation not only can be performed for specific rotational orientations of the pin portions 12*ab* to 12*db* with respect to the respective engaging portions 10*ab* to 10*db* but in any relative orientation by applying a sufficient pulling force on the handles 8*a* and 8*b*.

In addition to such inserts 18 of elastic material, the receiving sections 10*a* to 10*d* can be provided with biasing members (not shown), forcing the receiving portions 10*ab* to 10*db* towards a configuration, in which the pin portions 12*ab* to 12*db* cannot be engaged with or disengaged from the respective engaging portions 10*ab* to 10*db* without applying a pulling force sufficient to overcome the biasing force applied by the biasing members.

The receiving sections 10*a* to 10*d* are positioned in such a manner that at least two receiving sections 10*c* and 10*d* form a first main pivoting axis P1 and at least two other receiving sections 10*a* and 10*b* form a second main pivoting axis P2 parallel with the first main pivoting axis P1 but shifted transversally with respect to the first main pivoting axis P1. The respective engaging sections 12*a* to 12*d* are positioned in a corresponding manner to be engaged with the receiving sections 10*a* to 10*d* in the closed operation state of the compartment door 6*a*. Here, the second receiving section 10*b* and the third receiving section 10*c* are provided on the removable shelf 4 serving as coupling section for these two receiving sections 10*b* and 10*c*. Moreover, in the illustrated embodiment all of the provided engaging sections 12*a* to 12*d* are provided on the compartment door 6*a* serving as coupling section for the engaging sections 12*a* to 12*d*. However, also other configurations are possible.

Although, in the illustrated embodiment the second and the third receiving sections 10*b* and 10*c* are coupled by the removable shelf 4 to the housing 2 and the first and fourth receiving sections 10*a* and 10*d* are coupled directly to the housing 2, the compartment door assembly can be provided with a compartment frame (not shown), to which all of the receiving sections 10*a* to 10*d* are coupled, wherein the compartment frame is configured to be coupled to the housing 2.

Of course, instead of the receiving sections 10*a* to 10*d* the engaging sections 12*a* to 12*d* can be coupled to the housing while the receiving sections 10*a* to 10*d* are coupled to the compartment door 6*a*.

The receiving sections 10*a* to 10*d* and the engaging sections 12*a* to 12*d* always are provided in such a manner that two separate but parallel main pivoting axes P1 and P2 about which the compartment door 6*a* can be pivoted with respect to the housing 2, are formed.

In addition thereto, in the illustrated embodiment the hinge mechanism is configured such that the compartment door 6*a* can be fully disengaged from the housing 2. In other words, the compartment door assembly is configured such that also in an assembled state of the compartment door assembly, all of the engaging sections 12*a* to 12*d* can be disengaged from the respective receiving sections 10*a* to 10*d*. In this embodiment, such an operation state is achievable by operating both handles 8*a* and 8*b* simultaneously when the compartment door 6*a* is in the closed state.

Besides the hinge mechanism, the compartment door assembly 6 and the refrigerator 1, the present embodiments refer to generals cabinets and recreational vehicles like motor homes or caravans provided with at least one of the above described devices.

It is to be noted that for cabinets or refrigerators in recreational vehicles, the doors have to be provided with a locking mechanism preventing and autonomous opening of the door for example due to vibrations and or slanted positions for the recreational vehicle. However, the above described compartment door mechanism does not have to be provided with such a separate locking mechanism as in the assembled state, the main door of the cabinet or refrigerator, which has to be provided with such a locking mechanism locks the compartment door when the main door is closed. Accordingly, the overall structure of the compartment door assembly can be provided in the above described simple but reliable and highly functional configuration.

The above described exemplary embodiment is not provided to serve in a limiting manner but depict a possibility of implementing the present invention. A skilled artisan will easily see many possibilities of adapting the above described configurations without departing form the scope of protection defined by the accompanying claims.

REFERENCE NUMERALS

1 refrigerator/cabinet
2 housing
4 removable shelf/coupling section
4*a* coupling protrusion
4*b* locking member
6 compartment door assembly
6*a* compartment door/coupling section
10*a*-10*d* receiving sections
10*aa*-10*da* coupling portions
10*ab*-10*db* receiving portions
12*a*-12*d* engaging sections
12*ab*-12*db* pin portions
14*a* first flattened surface
14*b* second flattened surface
18 insert
P1 first (main) pivoting axis
P2 second (main) pivoting axis

The invention claimed is:

1. A hinge mechanism for supporting an interior compartment door pivotally to an interior compartment frame of a refrigerator, comprising:

at least two receiving sections and at least two engaging sections, wherein each of the at least two receiving sections is configured to be coupled to one of the interior compartment door or the interior compartment frame respectively, and each of the at least two engaging sections is configured to be coupled to the other of the interior compartment door or the interior compartment frame respectively, wherein each of the at least two engaging sections is configured to be engaged with and disengaged from one of the at least two receiving sections, wherein in an engaged state each of the at least two engaging sections is pivotable with respect to a corresponding receiving section of the at least two receiving sections about a corresponding pivoting axis;

wherein each of the at least two engaging sections has a pin portion having two flattened opposed surfaces and each of the at least two receiving sections has an h-shaped coupling portion and a receiving portion at an outward end of said h-shaped coupling portion, said receiving portion configured to receive the pin portion of the respective engaging section along a direction perpendicular with respect to said pivoting axis.

2. The hinge mechanism according to claim 1, wherein the pin portions are provided as longitudinal members having a non-rotational symmetric configuration with respect to its pivoting axis along the longitudinal direction of the pin portion such that the engaging section and thus the pin portion can be pivoted in the engaged state with the corresponding receiving section about the respective pivoting axis between a locked state and an unlocked state, wherein in the unlocked state the respective pin portion can be moved along the direction perpendicular with respect to the respective pivoting axis to be disengaged from the corresponding receiving section, and wherein in the locked state, the respective pin portion only can be rotated about its pivoting axis with respect to the corresponding receiving section.

3. The hinge mechanism according to claim 1, wherein each of the at least two engaging sections forms with the corresponding one of the at least two receiving sections of an open bracket hinge.

4. The hinge mechanism according to claim 1, wherein the at least two receiving sections at least partially are made of an elastic material, such that the at least two receiving sections are biased from a configuration, in which the at least two engaging sections can be freely engaged with and disengaged from the corresponding at least two receiving sections towards a second configuration, in which the at least two engaging sections are restrained within the corresponding receiving sections.

5. The hinge mechanism according to claim 1, wherein the hinge mechanism comprises:

said at least two receiving sections being at least four receiving sections and said at least two engaging sections being at least four engaging sections, wherein in particular said at least two receiving sections are provided with said coupling portions such that the pivoting axes defined by the respective receiving sections correspond with each other or are in parallel with each other but shifted transversally with respect to each other and/or said at least two engaging sections are provided on said coupling section such that the pivoting axes defined by the respective engaging sections correspond with each other or are in parallel with each other but shifted transversally with respect to each other, wherein all said receiving sections or said engaging sections are provided in such a manner that they are defining two parallel main pivoting axes.

6. A compartment door assembly for an internal compartment of a refrigerator, comprising:

an interior compartment door and a hinge mechanism configured to couple the interior compartment door to an internal compartment frame of the refrigerator;

said hinge mechanism, having:

at least two receiving sections and at least two engaging sections, each of said at least two receiving sections comprising a receiving portion extending from an end of an h-shaped coupling portion, wherein each of the at least two receiving sections is configured to be coupled to one of the interior compartment door or the internal compartment frame, respectively, and each of the at least two engaging sections is configured to be coupled to the other of the interior compartment door or the internal compartment frame respectively, wherein each of the at least two engaging sections is configured to be engaged with and disengaged from one of the at least two receiving sections, and wherein each of the at least two engaging sections has a pin portion having two flattened opposed surfaces and each of the at least two receiving sections has the receiving portion configured to receive the pin portion of the respective engaging section along a direction perpendicular with respect to its pivoting axis, wherein in an engaged state each of the at least two engaging sections is pivotable with respect to a corresponding receiving section of the at least two receiving sections about a corresponding pivoting axis.

7. The compartment door assembly according to claim 6, wherein all of the at least two receiving sections of the hinge mechanism are provided on one of the internal compartment frame or the interior compartment door, forming two parallel but transversally shifted main pivoting axes along two opposing sides of the one of the internal compartment frame and the interior compartment door and/or all of the at least two engaging sections of the hinge mechanism are provided on the other one of the internal compartment frame or the interior compartment door forming two parallel but transversally shifted main pivoting axes along said two opposing sides of the other one of the internal compartment frame and the interior compartment door.

8. The compartment door assembly according to claim 6, wherein the compartment door assembly is configured to be movable from a first operation state, in which the interior compartment door can seal an interior compartment and in which each of the at least two engaging sections is engaged with its corresponding receiving section, to a second operation state, in which the interior compartment door cannot seal a compartment and in which only some of the at least two engaging sections are engaged with its corresponding receiving sections, or to a third operation state, in which the interior compartment door cannot seal said compartment and in which only the other of the at least two engaging sections are engaged with its corresponding receiving sections.

9. The compartment door assembly according to claim 6, wherein the compartment door assembly is configured such that the interior compartment door can be fully disengaged by simultaneously disengaging all of the at least two engaging sections from said respective receiving sections.

10. The compartment door assembly according to claim 6, wherein the at least two receiving sections and the at least two engaging sections are formed integrally with the interior compartment door or the internal compartment frame.

11. The compartment door assembly according to claim 6, wherein the interior compartment door has at least two separate handles in the form of gripping apertures provided in a front surface of the interior compartment door, configured to be operated to move the interior compartment door with respect to at least a part of the hinge mechanism.

12. The compartment door assembly according to claim 6, wherein the compartment door assembly is configured to seal a freezer of said refrigerator, the freezer being in particular removable.

* * * * *